June 24, 1930.  M. L. NELSON  1,765,538
REMOTE CONTROL SYSTEM
Filed Nov. 16, 1921   6 Sheets-Sheet 4

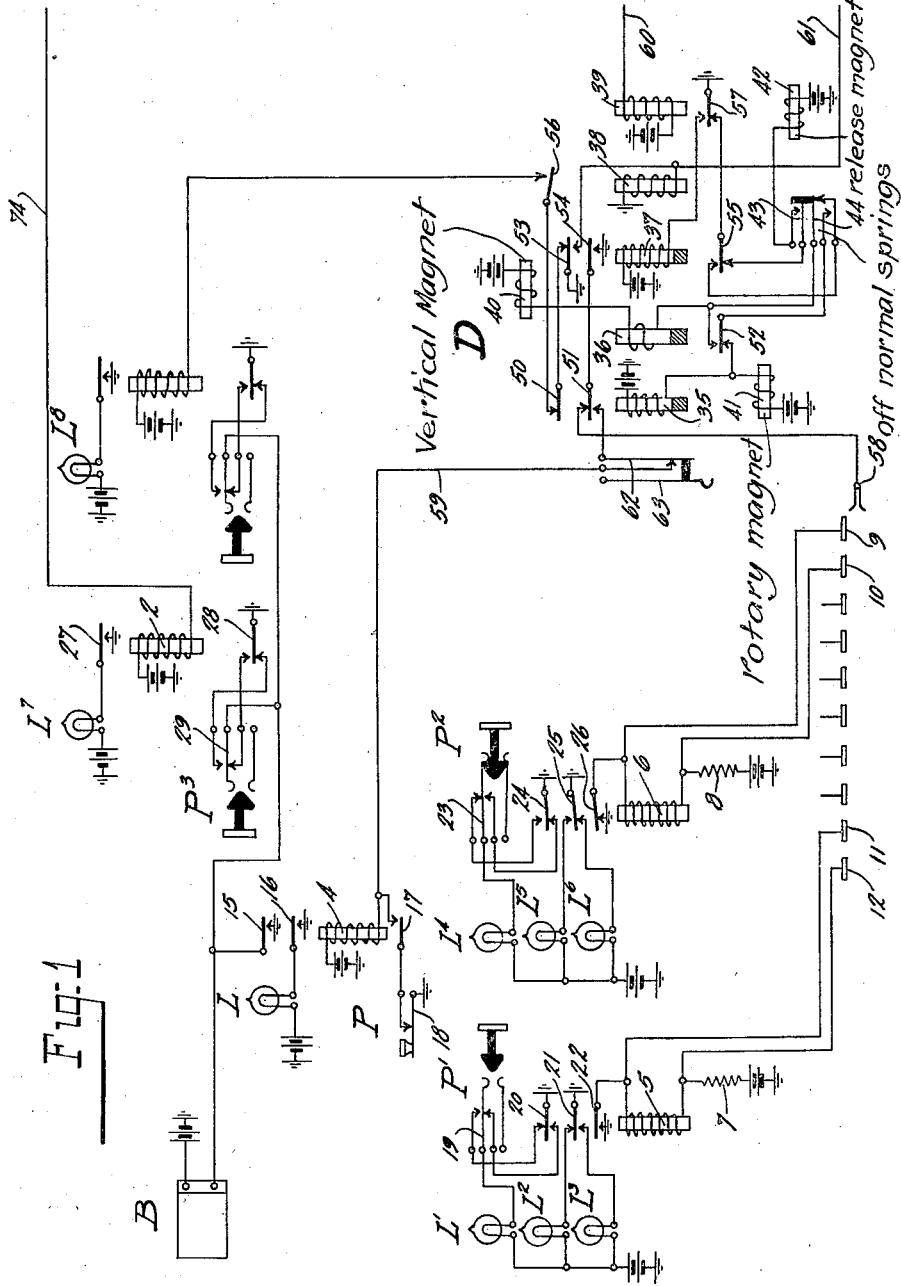

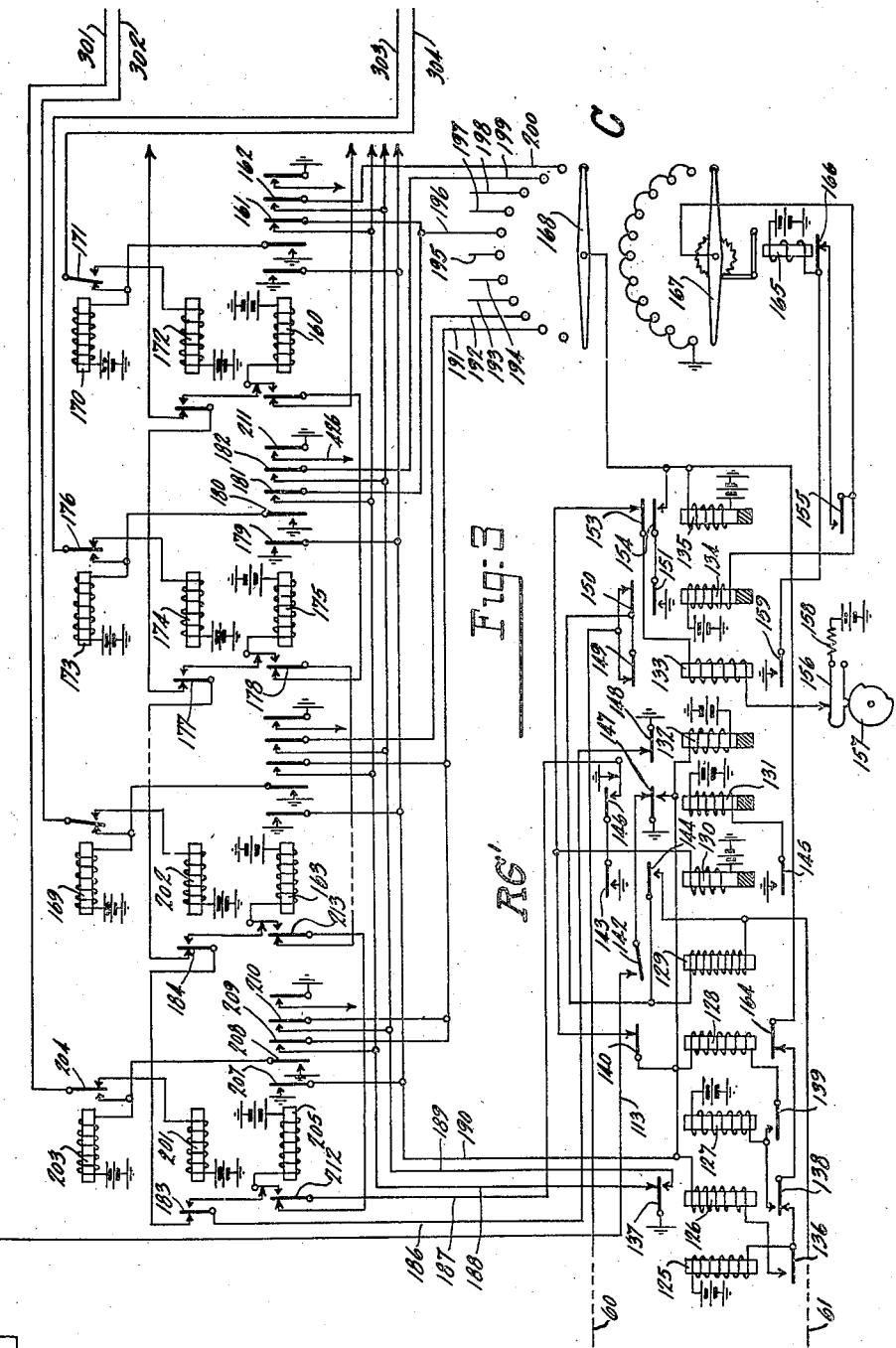

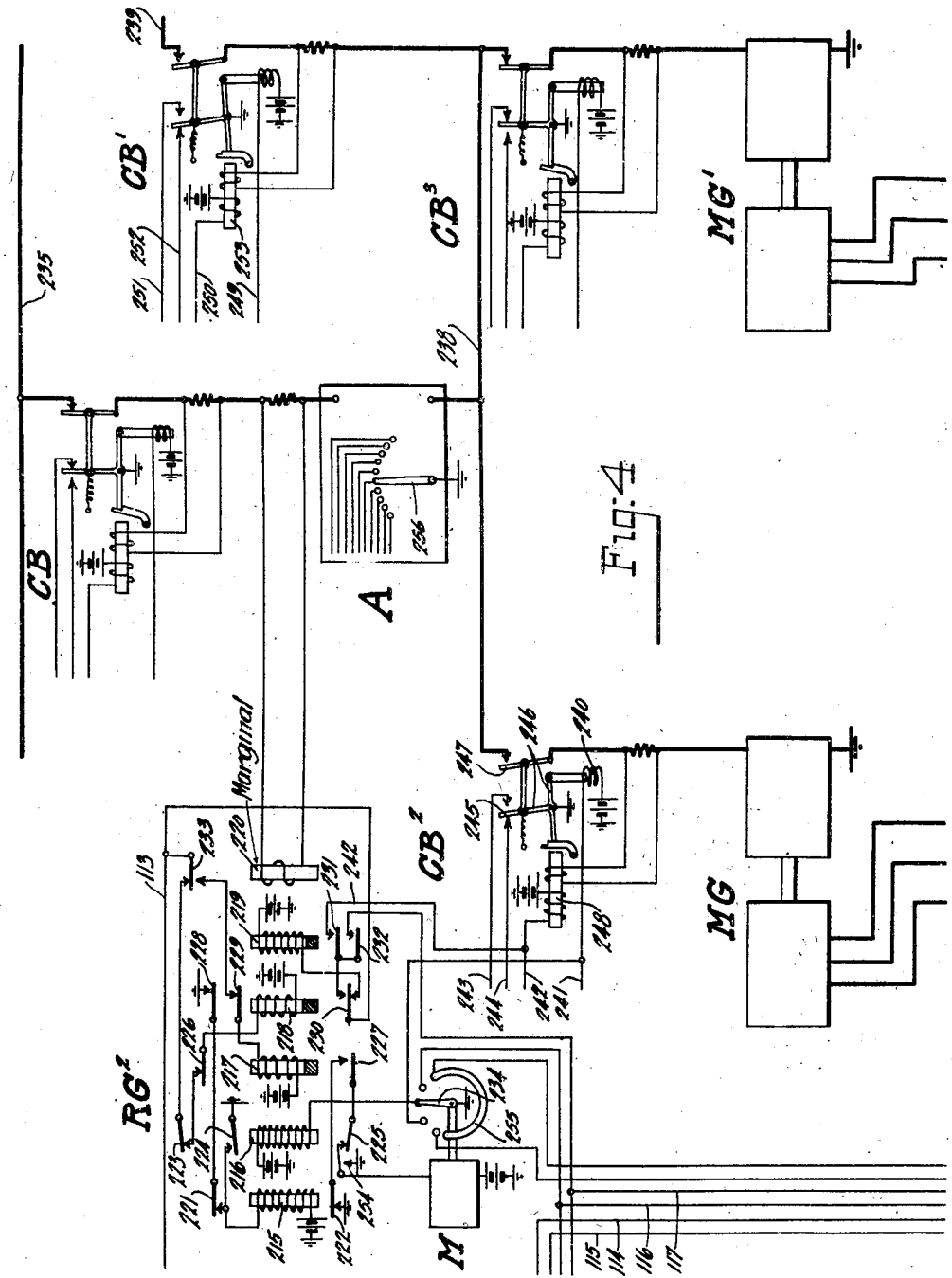

Inventor
Martin L. Nelson
Chas. M. Candy Atty.

June 24, 1930.                M. L. NELSON                1,765,538
                          REMOTE CONTROL SYSTEM
                          Filed Nov. 16, 1921          6 Sheets-Sheet 5
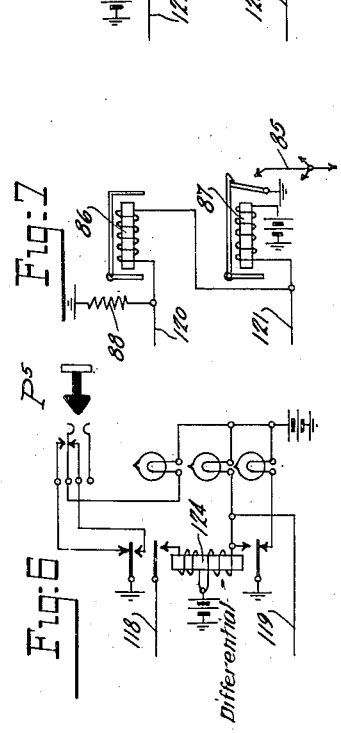
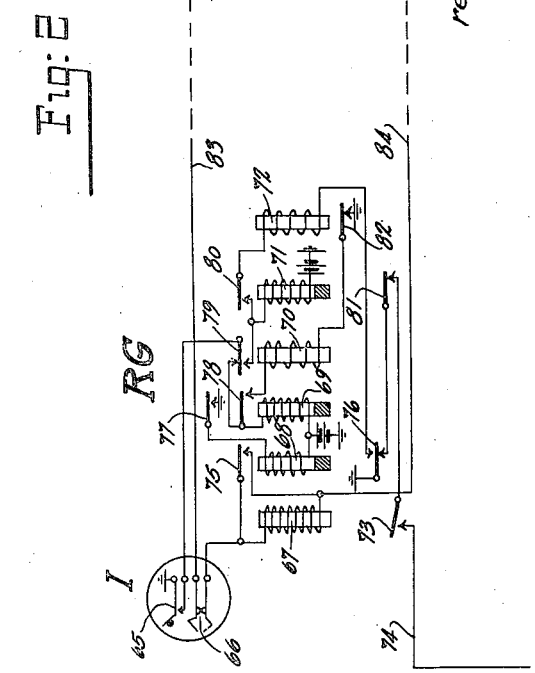
Inventor
Martin L. Nelson
Chas. Lee Candy Atty.

June 24, 1930.  M. L. NELSON  1,765,538
REMOTE CONTROL SYSTEM
Filed Nov. 16, 1921   6 Sheets-Sheet 6
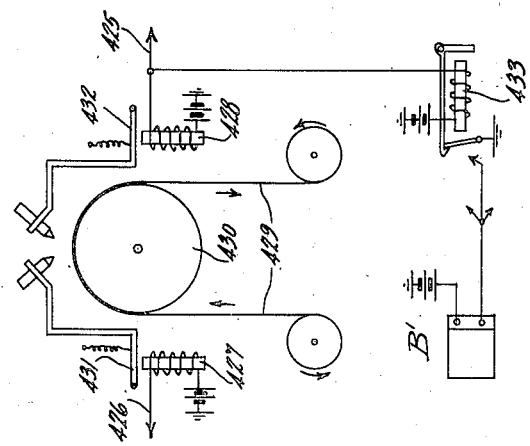
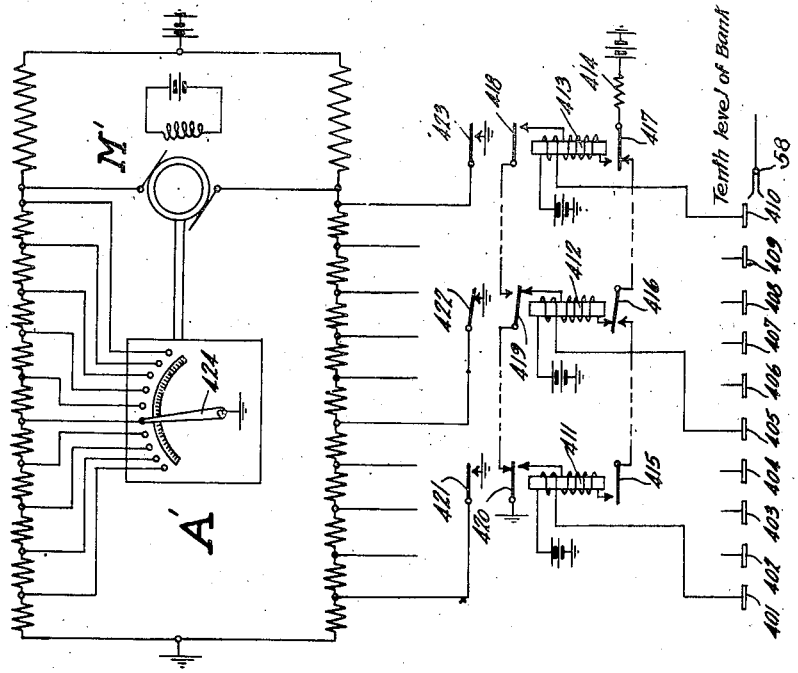
Inventor
Martin L. Nelson
Chas. M. Candy Atty.

Patented June 24, 1930

1,765,538

UNITED STATES PATENT OFFICE

MARTIN L. NELSON, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE

REMOTE CONTROL SYSTEM

Application filed November 16, 1921. Serial No. 515,664.

The present invention relates to remote control systems in general, but is more particularly concerned with remote control systems that may be used in connection with electric substations; and the principal object, briefly stated, is the provision of such circuit arrangements as are necessary in order to put such a remote control system into effective operation.

Other objects have to do with the refinement of the various circuits used so as to make them more efficient and desirable.

Still another object is to effect the desired control with the use of the smallest possible number of circuits between the apparatus to be controlled and the point from which it is controlled.

These objects, together with others which will not be specifically mentioned now, will be pointed out and explained fully hereinafter in connection with the accompanying drawings comprising Figs. 1–10, inclusive. In order to enable the system to be readily understood, Figs. 1, 3 and 5 should be arranged in order, with Fig. 2 over Fig. 3 and with Fig. 4 over Fig. 5, and with the corresponding lines in alignment.

The apparatus shown in Fig. 1 and in the left hand side of Fig. 2 is located in the controlling station which will be referred to hereinafter as the despatcher's office. The remaining equipment shown in Fig. 2, together with all the equipment shown in Figs. 3, 4 and 5, is located in the substation, which is connected with the despatcher's office by two pairs of conductors 60 and 61, and 83 and 84, as shown. The necessary control over the apparatus in the substation is exercised over the circuit composed of the pair of conductors shown in Fig. 2, and the signals indicative of the condition of the apparatus at the substation are received over the other pair of conductors, Figs. 1 and 3. The despatcher's office is assumed to contain duplicate equipment for every other substation in the system.

The substation shown is assumed to be provided for the purpose of supplying current to a trolley wire of an interurban electric line and may be located at some point along the line between two main stations, two similar substations, or a main station and another substation. As shown, the motor generator MG', Fig. 4, is in operation and the grounded generator of the unit is supplying current to the bus bar 238 by way of the circuit breaker CB³. The bus bar 238 is connected with the trolley wire 235 by way of the circuit breaker CB. The motor of the motor generator MG' is supplied with three phase alternating current from the high tension mains comprising conductors 350–352, inclusive, Fig. 5, by way of the associated transformer bank, low tension mains 347–349, inclusive, circuit breaker CB⁵, and the starter S'.

The motor generator MG may be placed in service by closing the circuit breaker CB⁴, Fig. 5; operating the starter S so as to bring the unit up to speed; and then closing the circuit breaker CB² which connects the generator of the motor generator MG to the bus bar 238.

The controlling switch D', Fig. 2, and the signal operating switch D, Fig. 1, are mechanically of the type of automatic switch disclosed in Automatic Telephony, by Smith and Campbell, a book published by McGraw-Hill Book Company, 370 Seventh Avenue, New York, N. Y., second edition. A photograph of such a switch is shown on page 55 of this publication and a skeleton drawing is shown on page 58. A description will be found accompanying the photograph. The circuits of these switches are shown complete and will be described fully hereinafter.

The circuit interrupter I, Fig. 2, associated with the relay group RG may be mechanically similar to the automatic sender or calling device shown on pages 40 and 41 of Automatic Telephony above referred to. The function of this interrupter is to control the switch D', with which it is connected by means of the two conductors 83 and 84 through the medium of the relay group RG. The circuits and functions of the relay group RG will be pointed out and explained more fully hereinafter.

The apparatus shown in Fig. 3 is actuated by the various devices shown in Figs. 4 and 5 through the medium of a plurality of conductors of which the conductors 301–304, inclusive, are shown. Each of these conductors extends to and terminates in one of the controlling relay sets as shown, such as the set comprising the relays 203, 201 and 205. These relay sets are designed so that they differently control the signal operating switch D to which they are connected through the medium of the relay group RG'.

The contact making switch C, Fig. 3, comprises two semi-circular rows of contacts which are wiped over by the wipers 167 and 168 as shown. These two wipers are rigidly secured to a common spindle and are operated by the stepping magnet 165 by means of which they are stepped from contact to contact as the magnet is alternately energized and deenergized. One mechanical embodiment of such a switch is shown on page 51 of Automatic Telephony, hereinbefore referred to.

For each different piece of apparatus in the substation such as starters, circuit breakers, etc., there appears in the despatcher's office three indicating lamps, such as the lamps L', L² and L³, together with a controlling key and relay, as shown, Fig. 1. In the case of a circuit breaker, one of the three lamps is lighted as long as it is thrown in and another lamp is lighted as long as it is tripped. When the circuit breaker changes position the lamp that is lighted goes out and the other lamp lights. At the same time the third lamp of the group becomes lighted to attract the attention of the despatcher to the fact that a change has occurred in that particular group of lamps. Each time a signal comes in, a common buzzer is operated to attract the attention of the despatcher, and in order to direct the attention of the despatcher to the signals of the substation from which the signal has come, a pilot lamp common to the signals pertaining to the substation in question is lighted. The despatcher is provided with a push button to shut off the buzzer and extinguish the pilot lamp and other push buttons one of which is used to extinguish the third lamp of the group of three lamps in which the change has taken place.

The overload control system comprising the relay group RG² and the motor M, Fig. 4, is provided for the purpose of giving emergency service by cutting the motor generator MG into service when the load becomes too much for the other unit and for cutting the unit MG out of service again when the load becomes small enough for the motor generator MG' to carry alone. The overload control system, however, is normally inoperative and is placed in service automatically in case either of the two circuits between the despatcher's office and the substation is accidentally opened, during the storm for example. The lamps L⁷ and L⁸ are provided for the purpose of informing the despatcher when either of the two circuits between the despatcher's office and the substation goes open accidentally.

Figs. 6, 7, and 8 show three modifications of the arrangement shown in Fig. 1 for receiving signals from the substation.

Fig. 9 shows a remote controlled ammeter which is located in the despatcher's office and controlled by the contact making ammeter A, Fig. 4. The manner in which this control is effected will be explained more fully hereinafter.

Fig. 10 shows certain signalling and recording mechanism that may be installed in a substation that differs from the one shown only in that the operations performed by the despatcher do not affect the devices at the substation directly but inform an attendant what to do.

Figure 5:
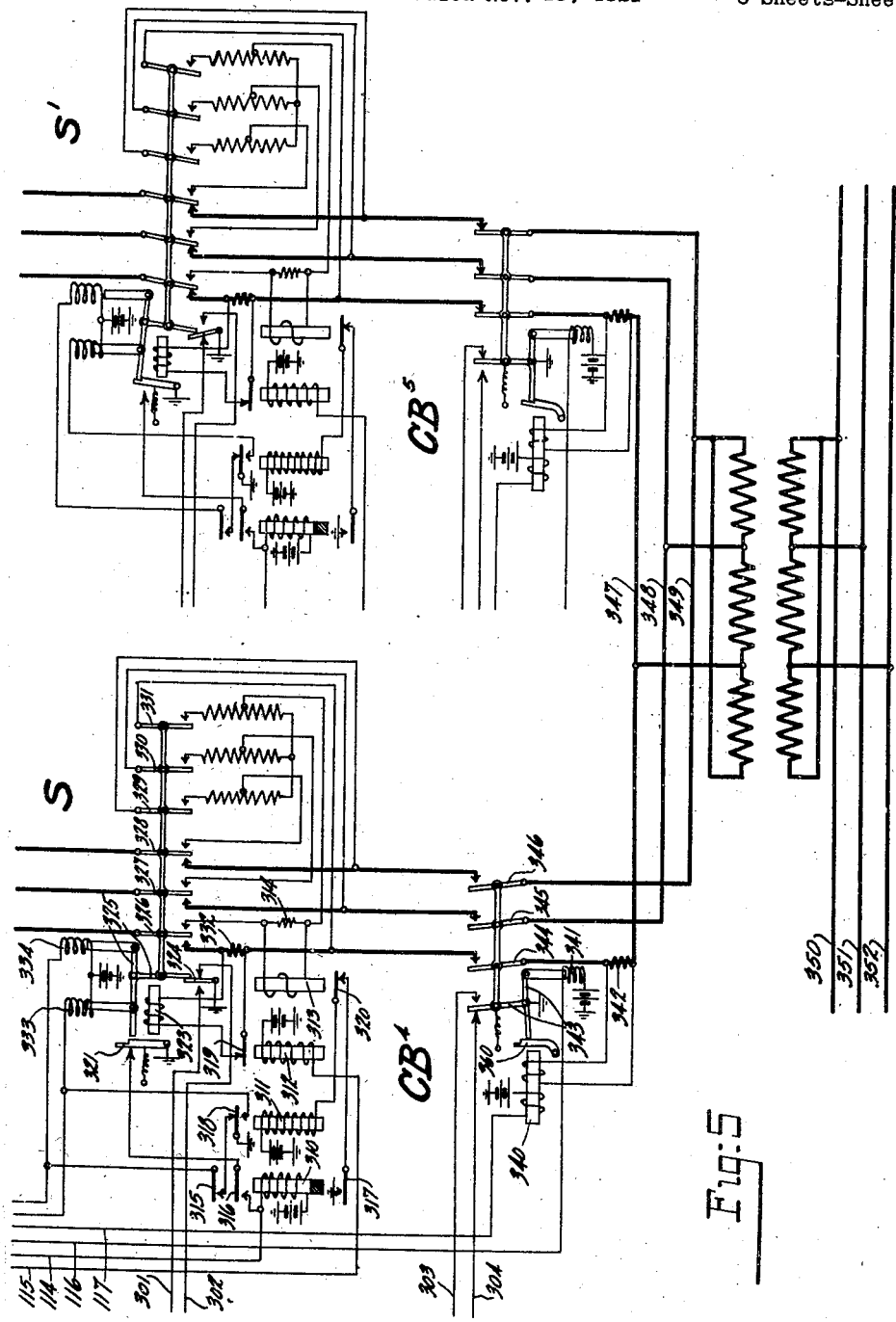

It is to be understood that, while there are shown a plurality of batteries in the drawings, there need be only one battery in the substation and one in the despatcher's office, the several batteries being shown for the sake of simplicity only.

The apparatus, having been described in general, will now be described in connection with a detailed description of its operation. For this purpose, it will be assumed that the despatcher, having been informed by the ammeter shown in Fig. 9 that the load in the substation is high enough to warrant the starting of another machine, decides to put the motor generator MG, Fig. 4, into operation so as to supply current for the trolley wire 235 in multiple with the motor generator MG'. In order for the despatcher to do this he must first operate the circuit breaker CB⁴ so as to connect up the leads 347–349, inclusive, to the starter S. In order to throw in the circuit breaker CB⁴ the despatcher must cause the control switch D', Fig. 2, to place ground momentarily on its bank contact in which conductor 116 terminates. This is done by manipulating the dial of the interrupter I associated with the relay group RG; first in accordance with the level of bank contacts of the switch D' in which conductor 116 terminates, the fifth level for example; and then in accordance with the particular contact in that level, which is the contact 111. When the dial of the interrupter I is moved from its normal position, the spring 65 is allowed to come into engagement with its associated contact, thereby closing a circuit for slow releasing relay 69, including armature 79 and its resting contact. Relay 69, upon energizing, prepares a circuit for relay 70 at armature 78, and at armature 77 closes a circuit for slow releasing relay 68. Relay 68, upon energizing, removes the ground potential from armature 73 and prepares a circuit for relay 72 at armature 76, and at armature 75 places a shunt around the high wound normally energized relay 67. Relay 67, upon deenergizing, allows armature 73 to come into engagement with its associated contact but since the ground potential has been removed from armature 73 by the energization of relay 68 this does not produce any result at this time.

In the substation, the marginally adjusted line relay 90 energizes in response to the shunting out of the high wound relay 67 in the despatcher's office and closes a circuit for the slow releasing release relay 92 at armature 99. Slow release relay 92, upon energizing, opens a point in the circuit of release magnet 95 and prepares a circuit for vertical magnet 96 at armature 105; places ground upon wiper 98 at armature 103; and at armature 104 removes ground from the resting contact of armature 100 and places a shunt around the normally energized relay 91. This is done so as to afford a better circuit for relay 90. Relay 91 deenergizes but does not perform any function at this time.

As the dial of the interrupter I in the despatcher's office returns to normal position, the circuit of line relay 90 of the switch D' is interrupted at the contacts 66 a number of times corresponding to the number for which the dial was operated which in this case is assumed to be five. Each time line relay 90 deenergizes, it opens the circuit of slow releasing release relay 92 but the said relay does not have time to fall back before its circuit is closed again upon the next energization of relay 90. As a further result of each deenergization of relay 90 it closes a circuit for vertical magnet 96 as follows: From ground by way of armature 99 and its resting contact, armature 105 and its working contact, the contact of off normal spring 102 and said spring, series relay 93, and vertical magnet 96 to battery. By the operation of vertical magnet 96, the shaft and wiper of the switch D' are raised step by step until the latter stands opposite the fifth level of contacts. Relay 93 is energized in series with the vertical magnet 96 and being slow releasing retains its armature 106 attracted throughout the vertical movement, thereby maintaining its own circuit and that of vertical magnet 96 intact after the off normal springs 101—102 have shifted as they do upon the first vertical step. At the end of the series of interruptions, line relay 90 comes to rest in an energized condition and slow releasing relay 93 upon deenergizing, transfers the operating circuit from vertical magnet 96 to the rotary magnet 97.

In the despatcher's office, the dial of the interrupter I, upon reaching normal position, opens the initial circuit of relay 69 at spring 65, whereupon relay 70 energizes in series with relay 69 over a circuit which extends from ground by way of the resting contact of armature 82 and said armature, relay 70, working contact of armature 78 and said armature and relay 69 to battery. Relay 69 is maintained energized in series with relay 70 and the latter upon energizing, opens still another point in the initial circuit of relay 69 and prepares a circuit for relay 71 at armature 79.

The despatcher now turns the dial of the interrupter I in accordance with the position of the contact in the fifth level of the switch D' in which the conductor 116 terminates and since the said contact, which is the contact 111, is the third contact in the level, the number for which the despatcher turns the said dial is 3. As soon as the dial of the interrupter I is moved from its normal position, spring 65 completes a circuit for slow releasing relay 71, which circuit includes armature 79 and its working contact. Relay 71, upon energizing, disconnects armature 73 of relay 67 at armature 81 and at armature 80 prepares a circuit for relay 72. The dial of the interrupter I in turning to normal position causes the contacts 66 to be separated three times, thereby producing three interruptions in the circuit of line relay 90 in the switch D'. Each time line relay 90 deenergizes in response to one of these interruptions, it closes a circuit for rotary magnet 97 as follows: from ground by way of armature 99 and its resting contact, armature 105 and its working contact, normally open contacts controlled by off normal spring 102, armature 106 and its resting contact, and rotary magnet 97 to battery. By the operation of rotary magnet 97, which receives three impulses at this time, the wiper 98 is rotated into engagement with the third contact in the fifth level which is the bank contact 111. Slow releasing relay 94 is maintained energized throughout the rotary movement in multiple with rotary magnet 97 and at armature 107 maintains the wiper 98 disconnected. At the end of the rotary movement, slow acting relay 94 deenergizes and connects up the wiper 98 at armature 107, thereby closing the following circuit for the solenoid 341 of the circuit breaker CB⁴: from ground by way of the working contact of armature 103, resting contact of armature 107 and said armature, wiper 98, bank contact 111, conductor 116, and solenid 341 to battery. Solenoid 341, upon energizing, draws down the associated plunger, thereby rotating the member 343 in a clockwise direction, whereupon the heavy armature 360 of the trip magnet 340 falls into place locking the member 343 in its operated position. As a result of the operation of the member 343, the contactors 344–346, inclusive, are forced into engagement with their associated contacts, thereby connecting up the leads 347–349, inclusive, with the starter S.

In the despatcher's office the dial of the interrupter I, upon returning to normal position after its second operation, opens the initial circuit of slow releasing relay 71, whereupon relay 72 energizes in series with relay 71 over a circuit which extends from ground, by way of armature 76 and its working contact, relay 72, armature 80 and its working contact, and relay 71 to battery. Relay 71 is maintained energized in series with relay 72 and the latter, upon energizing, opens the circuit of relays 69 and 70 at armature 82. Relay 70 deenergizes immediately but does not perform any particular function at this time. Relay 69, being slow releasing, is maintained energized for an interval and, upon finally falling back, opens the circuit of slow releasing relay 68 at armature 77. Relay 68 also maintained energized for an interval after its circuit is opened and, upon finally falling back, removes the shunt from around the high wound relay 67 at armature 75 and at armature 76 opens the circuit of relay 72 and places ground upon armature 81. Relay 72 deenergizes immediately but does not perform any function at this time. Relay 71, being slow releasing, holds its armature attracted long enough to permit the high wound relay 67 to energize before it replaces ground upon armature 73 at armature 81.

In the substation, line relay 90 of the switch D', being marginally adjusted, retracts its armature responsive to the removal of the shunt from around the high wound relay 67 of the relay group RG, thereby opening the circuit of slow release relay 92 and closing the previously traced operating circuit for rotary magnet 97. Rotary magnet 97 and relay 94 energize simultaneously. The energization of relay 94 serves to disconnect the wiper 98 at armature 107 and also to disconnect the resting contact of armature 100 at armature 108. The rotary magnet 97, upon energizing, advances the wiper 98 into engagement with bank contact 112. This however, does not have any particular function at this time, being merely an incidental operation. Slow releasing relay 92, upon deenergizing, removes the shunt from around relay 91 at armature 104; disconnects ground from the resting contact of armature 107 at armature 103; and at armature 105 opens the operating circuit whereupon rotary magnet 97 deenergizes. As a further result of the deenergization of release relay 92, it closes a circuit for release magnet 95 at armature 105 including off normal contacts 101 and armature 99 and its resting contact. By the operation of release magnet 95, the shaft and wiper of the switch D' are restored to normal position, the circuit of release magnet 95 being opened at off-normal contacts 101 by the switch shaft when it reaches normal position. Relay 94 which, as before stated, is slow releasing maintains the resting contact of armature 100 disconnected at armature 108 until after relay 91 has energized in response to the removal of the shunt from around it at armature 104 of release relay 92. Both the relay group RG and the switch D' are now in normal condition and are ready to be used again.

Before going further a few points in connection with the control equipment, Fig. 3, will be explained. Either of the relay groups, which comprise three relays each, such as the one shown in the upper left hand corner of the sheet and comprising relays 203, 201, and 205, when actuated by a ground potential on the associated control conductor, such as the conductor 301, causes the switch D in the despatcher's office to be prepared for operation in a manner to be explained fully hereinafter, after which two series of interruptions are produced in the circuit of the line relay of the said switch D. This operation is identically the same no matter which relay group is actuated, inasmuch as the production of two series of interruptions in the circuit of the line relay of the switch D is concerned, but differs in the number of interruptions produced. The minimum number of interruptions produced in any one series is one and the maximum number is ten. There are 100 such relay groups but, to avoid complicating the drawings unnecessarily, only four of them have been shown. The relay group in the upper left hand corner of Fig. 3, when actuated, sends in the number 11, which means that each of the two series of interruptions produced comprises only a single interruption. The second relay group sends in the number 12 which comprises one interruption in the first series and two in the second. The following groups of relays that send in the numbers 13–68, inclusive, have been omitted in the drawings and the third group shown sends in the number 69. The forth relay group shown sends in the number 60 which comprises six interruptions in the first series and ten in the second series. The following relay groups which send in the numbers 71–00, inclusive, have been omitted in the drawings. The number 00, it may be said, comprises ten interruptions in each series.

It will be understood that the dotted portions of the conductors extending between the second number sending group of relays and the third indicates that they pass through chain contacts on the intermediate relay sets that are not shown, which chain contacts are identical with those on the relay groups shown. These chain contacts are provided for the purpose of preventing two relay groups from being actuated simultaneously, giving first choice to the ones on the left.

Returning now to the circuit breaker CB⁴ which was operated as previously explained, responsive to it being operated, certain operations take place with the final result that the despatcher is notified that the circuit breaker has been successfully thrown in. The manner in which this is done will now be explained. As a further result of the operation of member 343, the ground potential is removed from conductor 304 and placed upon conductor 303. In response to the removal of the ground potential from conductor 304, relay 170, Fig. 3, deenergizes and at armature 171 connects conductor 304 with relay 172. This, however, does not produce any result at this time. As a result of the ground potential being placed on conductor 303, a circuit is closed for relay 174. Relay 174, upon energizing, closes the following circuit for relay 175: from ground by way of armature 148 of relay 132, which relay is located in the relay group RG' and the resting contact of the said armature, conductor 186 armature 183 and its resting contact, armature 184 and its resting contact, similar armatures and contacts on intermediate relays, (not shown) armature 177 and its working contact, normally closed contacts controlled by armature 177, and relay 175 to battery. Relay 175, upon energizing, closes a locking circuit for itself and opens its initial circuit at armature 178, the said locking circuit being as follows: from ground by way of the normally closed contacts controlled by armature 146 of relay 131, which relay is located in the relay group RG', conductor 187, armature 212 and its resting contact, armature 213 and its resting contact, armature 178 and its working contact, and relay 175 to battery. As a further result of the energization of relay 175 it closes a circuit for relay 173 at armature 180, whereupon relay 173 attracts armature 176, thereby opening the circuit of relay 174 and closing a locking circuit for itself. Relay 174, upon deenergizing, closes the chain contacts again at armature 177. As a still further result of the energization of relay 175 it connects the sixth impulse stop conductor 196 with the first digit stop conductor 188 at armature 181; connects the ninth impulse stop conductor 199 with the second digit stop conductor 189 at armature 182; and at armature 179 places ground upon the start conductor 190, thereby closing a circuit for the slow releasing relay 132. Relay 132, upon energizing, disconnects ground at armature 148 from conductor 186 and consequently from the chain of armatures and contacts including armatures 183, 184, etc. This is done so as to render ineffective the energization of any of the relays 201, 202, etc. until after the operations, necessary to inform the despatcher that the circuit breaker CB⁴ has been successfully thrown in, have been completed.

As a further result of placing ground upon start conductor 190 a circuit is closed for slow releasing relay 130, including armature 140 and its resting contact. Slow releasing relay 130, upon energizing, places ground upon armature 146 of relay 131 at armature 143, and places a shunt around the high wound normally energized relay 129 at armature 144. The said relay 129 holds its armature 142 attracted for a slight interval thereafter owing to the slow releasing effect caused by its self induction. As a further result of the energization of relay 130, it closes a circuit for slow releasing relay 131 at armature 145. Relay 131, upon energizing, disconnects ground from armature 142 of relay 129 at armature 147 before the latter relay has had time to fall back, and at the same armature 147 places a multiple ground upon the starting conductor 190 for a purpose that will be more apparent later. As a further result of the energization of slow releasing relay 131 it shifts the conductor 187 from ground, by way of the normally closed contacts controlled by armature 146, to ground, by way of the working contact of armature 146 and said armature, and armature 143 and its working contact.

In the despatcher's office, the marginally adjusted line relay 39 of the switch D energizes in response to the placing of the previously mentioned shunt around the high resistance normally energized relay 129 of the relay group RG', and closes a circuit for release relay 37 at armature 57. Release relay 37, upon energizing, opens a point in the circuit of release magnet 42 and prepares a circuit for vertical magnet 40 at armature 55; places ground on wiper 58 at armature 54; and at armature 53 removes ground from armature 56, at the same time placing a shunt around the normally energized relay 38. Relay 38 deenergizes but does not perform any particular function at this time. The switch D is now ready to be operated in the same manner as the switch D'.

Returning now to the relay group RG' in the substation, as a still further result of the placing of ground upon start conductor 190 the following circuit is closed: from ground by way of conductor 190, armature 140 and its resting contact, resting contact of armature 153 and said armature, impulse relay 133, the contact of spring 156 and said spring, and resistance 158 to battery. The spring 156 is alternately moved out of engagement with and brought into engagement with its associated contact by the motor driven cam 157, and consequently after the above traced circuit is closed for relay 133 the said relay is energized and deenergized once during each revolution of the cam 157. Each time relay 133 energizes it closes the circuit of stepping magnet 165 of the impulse counting switch C at armature 159. Stepping magnet 165, upon energizing the first time, attracts its armature, thereby causing the associated pawl to engage another notch on the ratchet wheel. When relay 133 deenergizes, it opens the circuit of stepping magnet 165 at armature 159, whereupon the said stepping magnet deenergizes, thereby rotating the wipers 167 and 168 in a clockwise direction and into engagement with the first set of associated bank contacts. The rotation of wiper 168 does not produce any result as yet, but wiper 167, upon coming into engagement with the first associated bank contact, closes the following circuit: from ground by way of the first contact in the bank of wiper 167, the said wiper 167, and pick up relay 134 to battery. Pick up relay 134, upon energizing, removes the shunt from around armature 149 and its resting contact of impulse relay 133 at armature 150. This does not have any immediate effect, however, owing to the fact that impulse relay 133 has just fallen back and consequently armature 149 is in engagement with its resting contact. The next time relay 133 energizes, in response to the closure of its circuit by the revolving cam 157, it opens the bridge across conductors 60 and 61 at armature 149 and consequently interrupts the circuit of line relay 39 of the switch D in the despatcher's office. As a further result of the energization of relay 133 it closes a circuit for stepping magnet 165 of the switch C and the said stepping magnet, upon energizing, causes the associated pawl to engage another notch on the ratchet wheel. When the circuit of impulse relay 133 is opened again, it, upon deenergizing, closes the bridge across conductors 60 and 61 at armature 149, and at armature 159 opens the circuit of stepping magnet 165 of the switch C, whereupon the wipers 167 and 168 are advanced into engagement with the second set of bank contacts. Since the second contact over which the wiper 167 passes is grounded also as well as all the following ones with the exception of the last contact, no effect is produced by the passing of this wiper to the next contact. Wiper 168, upon coming into engagement with its second associated bank contact, extends the circuit of the impulse stop relay 135 to the first stop conductor 191. This, however, does not produce any effect at this time for the reason that the stop conductor 191 is not connected up at any other point.

Impulse relay 133 continues to operate; the bridge across conductors 60 and 61 continues to be opened upon each energization thereof; and the wipers 167 and 168 continue to be advanced step by step in the manner described until the wiper 168 arrives upon the contact in which the sixth stop conductor 196 terminates, which is the first stop conductor that is connected up at any other point, at which time the bridge across the conductors 60 and 61 will have been opened six times at armature 49 of impulse relay 133. When wiper 168 arrives upon the bank contact in which stop conductor 196 terminates, the following circuit is closed: from ground by way of armature 137 of relay 126 and its resting contact, first digit stop conductor 188, working contact of armature 181 of relay 175 and said armature, sixth impulse stop conductor 196, wiper 168, and stop relay 135 to battery. Relay 135, upon energizing, closes a locking circuit for itself at armature 154, including armature 151 and its working contact. It will be noted that a circuit is closed for relay 125 in multiple with relay 135 by way of armature 164 and its resting contact, and armature 138 and its resting contact. Relay 125, upon energizing, closes a circuit for relay 126 at armature 136, but the said relay 126 does not energize for the time being owing to being short circuited by the ground potential which causes the energization of relay 135. As a further result of the energization of relay 135, it disconnects the impulse relay 133, while it is yet in a deenergized condition, at armature 153; and at armature 155 closes a circuit for stepping magnet 165, which circuit includes armature 166 and its resting contact, and wiper 167 and the bank contact with which it is in engagement. In response to the closure of this circuit the wipers 167 and 168 are rapidly advanced by the buzzer like action of stepping magnet 165, which opens its own circuit at armature 166. This action continues until the said wipers 167 and 168 are advanced into engagement with the last set of contacts when it is stopped because the last contact in the bank of wiper 167 is not grounded. As soon as the wiper 167 passes off the last grounded contact, the circuit of relay 134 is opened but the said relay, being slow releasing, is maintained energized for an interval. Upon deenergizing, relay 134, replaces the shunt around armature 149 and its resting contact at armature 150, and at armature 151 removes direct ground from the relays 135 and 125, whereupon relay 126, which heretofore has been short circuited, and which is connected with the grounded start conductor 190, energizes in series with relays 125 and 135. Upon energizing, relay 126 disconnects relay 135 from in multiple with relay 125 and connects it in multiple with relay 127. Relay 135, however, being slow acting, holds its armature attracted for an interval. As a further result of the energization of relay 126, it disconnects ground from the first digit stop conductor 188 and connects it to the second digit stop conductor 189 at armature 137. At length relay 135 deenergizes; disconnects stepping magnet 165 from wiper 167 at armature 155; and at armature 153 connects up impulse relay 133.

The circuits are now in readiness for the second digit 9 to be transmitted, the net result so far accomplished being the opening of the bridge across the conductors 60 and 61 six times and the transferring of the ground potential from the first digit stop conductor 188 to the second digit stop conductor 189. After the last interruption in the bridge across the conductors 60 and 61 a pause has occurred which is determined by the length of time required by the two slow releasing relays 134 and 135 to fall back one after the other. This is done so as to allow time for the change over operation from the vertical to the rotary movement to take place in the switch D.

Before describing how the second series of interruptions is produced, the effect of the first series of interruptions on the switch D in the despatcher's office will be considered. Each time line relay 39 of the switch D deenergizes in response to one of the interruptions produced in its circuit, it closes a circuit for vertical magnet 40 including armature 57 and its resting contact, armature 55 and its working contact, the contact of off normal spring 44 and said spring, series relay 36, and vertical magnet 40. By the operation of the vertical magnet 40, which receives six impulses at this time, the switch shaft and wiper are raised step by step until the latter stands opposite the sixth level of bank contacts which I shall assume is the level shown in the drawing. Relay 36 is energized in series with vertical magnet 40 and being slow releasing retains its armature 52 attracted throughout the vertical movement, thereby maintaining its own circuit and that of vertical magnet 40 intact after the off normal springs have shifted as they do upon the first vertical step. At the end of the vertical movement, the series relay 36, upon falling back, shifts the operating circuit from vertical magnet 40 to rotary magnet 41.

Returning now to the equipment at the substation, when relay 133 energizes again after having been connected up at armature 153 of relay 135 it closes the circuit of stepping magnet 165 at armature 159, whereupon the associated pawl is caused to engage another notch on the ratchet wheel. When impulse relay 133 deenergizes again, the wipers 167 and 168 are advanced into engagement with the first set of contacts, whereupon pick up relay 134 energizes in response to wiper 167 coming into engagement with the grounded contact, and upon so doing, prepares a locking circuit for relay 135 at armature 151, and at armature 150 removes the shunt from around armature 149 and its resting contact. Relay 133 continues to energize and deenergize in the manner hereinbefore described and at armature 149 opens the bridge across conductors 60 and 61 each time it energizes, at the same time operating stepping magnet 165 in the usual manner at armature 159. This operation continues uninterrupted until the wiper 168 comes into engagement with the bank contact in which the ninth impulse stop conductor 199 terminates, at which time the bridge across the conductors 60 and 61 will have been opened nine times. When wiper 168 comes into engagement with the bank contact in which the ninth impulse stop conductor 199 terminates, the following circuit is closed: from ground by way of armature 137 of relay 126 and its working contact, the second digit stop conductor 189, the working contact of armature 182 of relay 175 and said armature, stop conductor 199, wiper 168 and stop relay 135 to battery. A branch of this circuit extends by way of armature 164 and its resting contact, armature 138 and its working contact, and relay 127 to battery. Relay 127, upon energizing, prepares a circuit for relay 128 at armature 139 but the said relay 128 does not energize for the time being owing to the fact that it is grounded at both terminals. Stop relay 135, upon energizing, disconnects impulse relay 133 at armature 153; closes a locking circuit for itself and for relay 127 at armature 154; and at armature 155 connects the stepping magnet 165 to wiper 167 through armature 166 and its resting contact. As a result, the wipers 167 and 168 are now advanced step by step by the buzzer like action of stepping magnet 165 until they come into engagement with the last set of bank contacts. When wiper 167 passes off the last grounded contact, the stepping magnet circuit is opened and the circuit of slow releasing relay 134 is opened. Relay 134, upon deenergizing, replaces the shunt around armature 149 and its resting contact at armature 150, and at armature 151 removes direct ground from the circuit of relays 135 and 127, whereupon relay 128 energizes in series with relay 127, ground being supplied by way of start conductor 190, and upon so doing, disconnects relay 135 from in multiple with relay 127 at armature 164. Relay 135, however, being slow acting, retains its armature attracted for an interval. As a further result of the energization of relay 128, it disconnects the grounded conductor 190 from the circuit of impulse relay 133 (the said circuit being open at this time at armature 153) and opens the circuit of relay 130 at armature 140. Relay 130, being slow releasing, retains its armatures attracted for an interval. Returning now to slow releasing relay 135, the said relay, upon deenergizing, closes a point in the circuit of impulse relay 133 at armature 153 but this does not have any effect at this time owing to the fact that the circuit has previously been opened at armature 140 as pointed out. Slow releasing relay 130, upon deenergizing, removes the shunt from around the high wound relay 129 at armature 144, whereupon the said relay energizes, thereby moving armature 142 from in engagement with its resting contact. As a further result of the deenergization of relay 130, it opens the circuit of relay 131 at armature 145, but the said relay, being slow releasing, retains its armatures attracted for an interval. As a still further result of the denergization of relay 130, it removes ground from locking conductor 187 at armature 143, whereupon relay 175 deenergizes, thereby disconnecting the stop conductors 196 and 199 from the first digit stop conductor 188 and the second digit stop conductor 189, at armatures 181 and 182, respectively; connects its own winding through the normally closed contacts controlled by armature 178 to the working contact of armature 177 again; opens the initial circuit of relay 173 at armature 180 but the said relay remains locked up by way of the circuit which includes conductor 303 and armature 176 and its working contact. As a still further result of the deenergization of relay 175 it disconnects start conductor 190 from ground at armature 179 but the said conductor is still grounded at armature 147 of relay 131. After an interval slow releasing relay 131 falls back; replaces the ground potential upon locking conductor 187 at the normally closed contacts controlled by armature 146; and at armature 147 removes ground from conductor 190. When the ground potential is removed from conductor 190, the circuit of relays 125-128, inclusive, and 132 is opened. Relays 125-128, inclusive, deenergize immediately. Relay 132, however, being slow releasing, retains its armature attracted for an interval. Relay 132, upon deenergizing after an interval, places ground upon conductor 186 again, thereby completing the entire cycle of operations. The circuits are now in readiness to be used over again to transmit another combination of impulses to the switch D.

In the switch D each time line relay 39 deenergizes in response to one of the interruptions of the second series produced in its circuit, it completes the following circuit: from ground by way of armature 57 and its resting contact, armature 55 and its working contact, normally open contacts controlled by off normal spring 44, armature 52 and its resting contact and rotary magnet 41 to battery. By the operation of rotary magnet 41 which receives nine impulses at this time, the wiper 58 is rotated step by step until it comes into engagement with the ninth contact in the sixth level which is the contact 11. Relay 35 is energized in multiple with rotary magnet 41 and, being slow releasing, retains its armatures attracted through the rotary movement, thereby maintaining the wiper 58 disconnected and at the same time completing the following circuit for pilot relay 4 at armature 51: from ground by way of the working contact of armature 54 and said armature, armature 51 and its working contact, shaft operated spring 62 and its resting contact, conductor 59, and pilot relay 4 to battery. Relay 4, upon energizing, closes a locking circuit for itself at armature 17; closes a circuit for the pilot lamp L at armature 16; and at armature 15 closes a circuit for the buzzer B. At the end of the rotary movement, relay 35 deenergizes and at armature 51 connects up the wiper 58, thereby completing the following circuit: from ground by way of the working contact of armature 54 and the said armature, armature 51 and its resting contact, wiper 58, bank contact 11, relay 5, and resistance 7 to battery. Relay 5, upon energizing, closes a locking circuit for itself at armature 22; opens the circuit of the lamp L² and closes the circuit of the lamp L³ at armature 21; and at armature 20 closes a circuit for the lamp L', the said circuit including the resting contact of spring 19 of the push button P' and said spring. As a result of these circuit changes caused by the energization of relay 5 the signal lamp L² becomes extinguished and the signal lamp L³ becomes lighted, and the individual pilot lamp L' becomes lighted to inform the despatcher in which set of lamps the change has occurred.

After a slight interval, line relay 39 falls back in response to the removal of the shunt from around the high wound relay 129 in the relay group RG', as previously described. Upon falling back, armature 57 of line relay 39 opens the circuit of release relay 37 and closes the previously traced circuit for rotary magnet 41. Rotary magnet 41, upon energizing, rotates the wiper 58 into engagement with bank contact 12. This, however, does not have any particular utility and is merely an incidental occurrence. Relay 35, upon energizing, in multiple with rotary magnet 41 disconnects the wiper 58 before it is moved out of engagement with contact 11 and places ground upon conductor 59 again at armature 51. The placing of ground upon conductor 59 does not produce any effect at this time because relay 4 is already energized. As a further result of the energization of relay 35, it disconnects armature 56 of relay 38 at armature 50. After a time, release relay 37 deenergizes and at armature 53 removes the shunt from around relay 38 and places ground on armature 50, whereupon relay 38 energizes, thereby bringing armature 56 out of engagement with its resting contact. As a further result of the deenergization of release relay 37 it opens the circuit of rotary magnet 41 and slow releasing relay 35 at armature 53, at the same time closing a circuit for release magnet 42 including off normal contacts 43. By the operation of release magnet 42, the shaft and wiper of the switch D are restored to normal position in the usual manner, the circuit of release magnet 42 being opened at off normal contacts 43 by the switch shaft when it reaches normal position. Slow releasing relay 36, upon deenergizing, connects up armature 56 at armature 50, and connects up wiper 58 at armature 51. The circuit conditions and the mechanical position of the switch D are now both at normal.

When a signal comes in to the despatcher's office responsive to some change not brought about by him through the control circuit, the tripping of a circuit breaker for example, the despatcher, upon hearing the buzzer B observes the various common pilot lamps, of which only the pilot lamp L is shown, to ascertain from which substation the signal has come and, upon finding out from which substation the signal has come in, he operates the pilot release push button, such as the push button P, momentarily, thereby opening the locking circuit of the associated pilot relay, such as the pilot relay 4, whereupon the said relay deenergizes; the lamp L becomes extinguished; and the buzzer B ceases to operate. In the present case, however, the despatcher is waiting for the signal and the operation of the pilot relay 4 is merely incidental. The despatcher now knows from the fact that the lamp L² is extinguished and the lamp L³ is lighted that the circuit breaker CB⁴ in the substation has been successfully thrown in. In order to extinguish the individual pilot lamp L' and to prepare a circuit for it which will be closed when the next signal comes in from the circuit breaker CB⁴, the despatcher operates the locking push button P', thereby shifting the spring 19 from engagement with its resting contact into engagement with its working contact, whereupon the pilot lamp L' becomes extinguished.

To continue with the explanation it may be said that the despatcher, having received the signal that the circuit breaker CB⁴ has been thrown in successfully now performs the operations necessary in order to operate the starter S, which consists in manipulating the dial of the interrupter I so as to send out two series of interruptions to the controlling switch D'. The number of interruptions in the first series will correspond to the level of bank contacts in which the starting lead from the starter S terminates, and the number of interruptions in the second series will correspond to the particular contact in that level in which the said starting lead terminates. The starting lead for the starter S is the conductor 114 and terminates in the bank contact 109 of the switch D', which is the first contact in the fifth level. Accordingly the first series of interruptions will comprise five interruptions and the second series will comprise only one.

When the despatcher turns the dial of the interrupter I in accordance with the first digit 5, the various relays of the relay group RG operate in the manner described hereinbefore with the result that the high wound relay 67 is short circuited and the line and release relays 90 and 92 of the switch D' are energized, thereby preparing the switch for operation in the manner described hereinbefore. As the dial of the interrupter I returns to its normal position the circuit of line relay 90 of the switch D' is interrupted five times with the result that the vertical magnet 96 is operated five times, thereby raising the wiper 98 opposite the fifth level of bank contacts.

In response to the second manipulation of the interrupter I, the circuit of line relay 90 is interrupted once, whereupon the rotary magnet 97 operates to step the wiper 98 into engagement with the first bank contact 109 in the fifth level, after which ground is placed upon wiper 98 and consequently upon bank contact 109. As soon as the various relays of the relay group RG have had time to function, the high wound relay 67 is again inserted in the circuit of line relay 90, whereupon the said line relay deenergizes with the result that the switch D' is restored to normal position in the previously described manner.

As a result of placing the ground potential upon bank contact 109, a circuit is closed by way of conductor 114 for relay 310 associated with the starter S. Relay 310, upon energizing, closes a circuit for relay 311 at armature 317. Relay 311, however, is inductively wound and stiffly adjusted so as to make it relatively slow to energize after its circuit is closed and consequently it does not operate for an interval. As a further result of the energization of relay 310, it closes a locking circuit for itself at armature 316, and at armature 315 closes the following circuit: from ground by way of armature 318 and its resting contact, working contact of armature 315 and said armature, and solenoid 334 to battery. Solenoid 334, upon becoming energized, attracts the associated plunger, thereby rotating the member 325 in a counter clock wise direction, which through the medium of the connecting rod shown brings the contactors 326–331, inclusive, into engagement with their right hand contacts. The contactors 329–331, inclusive, upon being operated, connect up the associated auto transformer, and the contactors 326–328, inclusive, connect the secondary taps from the auto transformer to the motor unit of the motor generator MG, whereupon the motor generator begins to gather speed. When the initial inrush of current occurs, the marginally adjusted relay 313, which is shunted around the low resistance 314, is operated and at its armature 320 opens the circuit of relay 311 before the said relay 311 has had time to energize.

After the speed of the motor generator unit MG has been brought to a point which approximates its running speed, the current flow decreases sufficiently to allow the marginally adjusted relay 313 to fall back, thereby closing the circuit of relay 311. Relay 311, upon energizing, opens the circuit of solenoid 334 and closes the circuit of solenoid 333 at armature 318, whereupon the member 325 is rotated in a clockwise direction, thereby swinging the contactors 326–331, inclusive, to the left. The contactors 329–331, inclusive, disconnect the auto transformer, and the contactors 326–328, inclusive, disconnect the motor leads from the secondary windings of the auto transformer and throw them direct onto the line. When this is done, the magnet 323, which is shunted around the low resistance 332, attracts the armature 321, thereby locking the member 325 in its operated position. As a further result of the operation of armature 321, the circuit of relay 310 is opened. Relay 310, is made slightly slow releasing so as to insure that the member 325 is properly locked before it deenergizes. Relay 310, upon deenergizing, opens the circuit of relay 311 at armature 317. Relay 311, upon deenergizing, opens the circuit of solenoid 333 at armature 318. The starter S is now completely operated and the motor generator MG is running and accordingly it remains only to throw in the circuit breaker CB² so as to connect the generator unit in multiple with the generator unit of the motor generator MG'.

The despatcher is now informed of the fact that the starting of the motor generator MG has been completed in a manner that will be described now. In the starter S, when the member 325 is rotated in the clockwise direction, as described, the spring 324 is moved out of engagement with its resting contact and into engagement with its working contact, thereby removing the ground potential from conductor 302 and placing a ground potential on conductor 301. When the ground potential is removed from conductor 302 relay 169 deenergizes and connects up relay 202. This, however, does not produce any result at this time. When the ground potential is placed upon conductor 301 a circuit is closed for relay 201. Relay 201, upon energizing, removes ground from the armatures 184, 177, etc. and closes a circuit for relay 205 at armature 183. Relay 205, upon energizing, closes a locking circuit for itself and opens its initial circuit at armature 212, and at armature 208 closes a circuit for relay 203. Relay 203, upon energizing, opens the circuit of relay 201 and closes a locking circuit for itself at armature 204. As a further result of the energization of relay 205, it connects the first digit stop conductor 188 with the first impulse stop conductor 191 at armature 209 and at armature 210 connects the second digit stop conductor 181 with the first impulse stop conductor 191 also. Thus it will be seen that the first series of impulses to be sent to the switch D as well as the second series will comprise a single impulse. As a still further result of the energization of relay 205 it places ground upon start conductor 190 which produces the hereinbefore described results in the relay group RG' one of which is that the high resistance relay 129 is short circuited, whereupon the switch D is prepared for operation in the manner described hereinbefore. As another result of the placing of ground upon start conductor 190 the wipers 167 and 168 are rotated into engagement with the first set of bank contacts, whereupon pick up relay 134 energizes and removes the shunt from around armature 149 and its resting contact of impulse relay 133, at armature 150. Upon the next energization of impulse relay 133, the circuit of line relay 39 of the switch D is interrupted and, upon the subsequent deenergization of the said relay 133, the circuit of line relay 39 of the switch D is closed again and the wipers 167 and 168 are advanced into engagement with the second set of bank contacts, whereupon the following circuit is closed: from ground by way of the first digit stop conductor 188, working contact of armature 209 and said armature, first impulse stop conductor 191, wiper 168 and relay 135 to battery. Relay 135, upon energizing, disconnects impulse relay 133 at armature 153 and at armature 155 connects operating magnet 165 through its interrupter contacts 166 to wiper 167. The wipers 167 and 168 are now advanced in the previously described manner to their normal position after which relay 126 energizes and transfers ground from the first digit stop conductor 188 to the second digit stop conductor 189.

After the pause, caused by the slow releasing relays 134 and 135, impulse relay 133 is connected up again and the shunt is removed from around armature 149 with the result that another interruption is produced in the circuit of line relay 39 of the switch D after which the wipers 167 and 168 are again advanced into engagement with their second set of contacts, whereupon stop relay 135 energizes over the following circuit: from ground by way of the second digit stop conductor 189, working contact of armature 210, and said armature, and from thence to battery by way of the previously traced circuit which includes stop relay 135. Stop relay 135, upon energizing, again disconnects impulse relay 133 and connects the operating magnet to wiper 167 with the result that the wipers 167 and 168 are rotated into normal position. After an interval, the various relays of the relay group RG' operate in the manner described hereinbefore to remove the shunt from around high wound relay 129 and to finally restore circuit conditions of all the relays of the relay group RG' to normal.

In the switch D, line relay 39, upon deenergizing, in response to the first interruption produced in its circuit closes the previously traced circuit for vertical magnet 40 whereupon the wiper 58 is raised opposite the first level of bank contacts.

In response to the next interruption produced in its circuit, line relay 39, upon deenergizing, closes the previously traced circuit for rotary magnet 41 and relay 35 in multiple, whereupon the wiper 58 is advanced into engagement with the first bank contact in the first level and ground is placed upon conductor 59, thereby closing a circuit for pilot relay 4 which energizes with the result that the lamp $L^6$ is lighted and the buzzer B begins to operate. When slow relay 35 falls back, ground is placed upon wiper 58 and, assuming merely for the purpose of illustration that the bank contact 10, even though it is not the first contact in the first level but is the second contact in the sixth level, is the one with which the wiper 58 is in engagement, relay 6 is short circuited by the ground potential which is placed upon bank contact 10 and, upon deenergizing, opens its locking circuit at armature 26; opens the circuit of the lamp $L^6$ and closes the circuit of the lamp $L^5$ at armature 25; and at armature 24 closes a circuit for the individual pilot lamp $L^4$, the said circuit including the working contact of spring 23 and said spring.

Responsive to the permanent deenergization of line relay 39, which occurs when the high wound relay 129 of the relay group RG' is inserted into its circuit, the switch D is restored to the normal position in the hereinbefore described manner.

The despatcher, upon being attracted by the buzzer B, observes the pilot lamp L, thereby ascertaining from which substation the signal has come in and, by observing the individual pilot lamp $L^4$, ascertains in which group of lamps the change has occurred. The despatcher now operates the push button P momentarily, whereupon relay 4 deenergizes; the lamp $L^8$ becomes extinguished; and the buzzer B ceases to buzz. In order to extinguish the individual pilot lamp $L^4$ and to prepare another circuit for it, the despatcher pulls out the push button $P^2$, thereby freeing the spring 23 and allowing it to come into engagement with its resting contact, whereupon the lamp $L^4$ becomes extinguished.

In order to operate the circuit breaker $CB^2$ the despatcher manipulates the interrupter I first in accordance with the level of contacts in the bank of the switch D' in which the conductor 241 terminates, and then in accordance with the particular contact in the level. As a result, the wiper 98 is brought into enengagement with the desired contact in a manner described hereinbefore, whereupon ground is placed upon conductor 241, thereby closing a circuit for solenoid 240. Solenoid 240, upon energizing, attracts the associated plunger, thereby causing the member 246 to be rotated in a clockwise direction. When the member 246 has been operated it is prevented from returning by the notch in the armature of trip magnet 248. As a result of the rotation of the member 246 the contactor 247 is forced into engagement with its associated contact, thereby connecting the generator unit of the motor generator MG with the bus bar 238. The motor generator MG is now in service.

The despatcher is informed that the circuit breaker $CB^2$ has been successfully thrown in in a manner that will be pointed out briefly now. As a still further result of the rotation of the member 246, ground is removed from conductor 244 and is placed upon conductor 243. These conductors (243 and 244) correspond to the conductors 303 and 304 of the circuit breaker $CB^4$ and they accordingly extend to two similar groups of relays the difference being that they are arranged to operate the line relay of the switch D a different number of times when ground is removed from one and placed upon the other. That being the case the switch D is again operated at this time and through the medium of signals (not shown) which may be like the ones shown the despatcher is notified of the fact that the circuit breaker $CB^2$ has been successfully thrown in.

In case the despatcher decides that the current which must be supplied to the trolley wire 235 at some particular time, for example, when there are a great many cars running close together and drawing current from this section, is more than the units MG and MG' can furnish without being damaged, he may connect up the feeder 239 from another substation to the bus bar at that station by means of circuits (not shown) which may be identical with the ones shown. After having connected up the feeder 239 at the other substation, the despatcher operates the interrupter I in accordance with the correct number, thereby causing the wiper 98 of the switch D' to be brought into engagement with the bank contact in which the conductor 249 of the circuit breaker CB' terminates, whereupon the circuit breaker is thrown in, in a manner described hereinbefore.

After the current demand has disappeared somewhat, the despatcher may disconnect the lead 239 by operating the interrupter I in accordance with the correct number, thereby grounding conductor 250 by causing the wiper 98 of the switch D' to be brought into engagement with the bank contact in which the said conductor 250 terminates. When the ground potential is placed upon conductor 250, a circuit is closed for trip magnet 253, whereupon the associated armature is attracted allowing the circuit breaker CB' to return to normal position, thereby disconnecting the lead 239 from the bus bar 238. It is to be understood that the conductors 251 and 252 correspond to the conductors 303 and 304 of the circuit breaker $CB^4$ and consequently the despatcher is informed of each change of position of the circuit breaker CB'.

Assuming that the current demand from this substation decreases still further until the load can be carried by one machine, the despatcher may disconnect the generator unit of the motor generator MG from the bus bar 238 by tripping the circuit breaker CB². This operation is performed by suitably manipulating the interrupter I so as to cause the wiper 98 of the switch D' to be brought into engagement with the bank contact in which conductor 242 of the circuit breaker CB² terminates. When this is done a circuit is closed for trip magnet 248, whereupon the associated armature is withdrawn from the member 246 and the circuit breaker returns to normal position. The despatcher is informed that the circuit breaker has been successfully tripped in response to the placing of ground upon conductor 244 which operates a signal in the despatcher's office in the previously described manner.

In order to trip the circuit breaker CB⁴, the despatcher causes the wiper 98 of the controlling switch D' to be brought into engagement with bank contact 112, thereby placing a ground potential upon conductor 117. When this is done trip magnet 340 energizes disengaging armature 360 from the member 343, whereupon the circuit breaker returns to normal position. In response to the removal of the ground potential from conductor 303 and to the placing of the ground potential upon conductor 304, relay 173 deenergizes and relay 172 energizes, thereby closing a circuit for relay 160. Relay 160, upon energizing, in addition to placing ground upon start conductor 190 and closing a circuit for relay 170, connects the first digit stop conductor 188 to the sixth impulse stop conductor 196 and connects the second digit stop conductor 189 to the tenth impulse stop conductor 200. The relays of the relay group now function in the usual manner and the wipers 167 and 168 are rotated over the associated bank contacts twice, thereby closing the circuit of the line relay of the switch D, and then producing two series of interruptions in the said circuit, the first of which comprises six interruptions and the second of which comprises ten interruptions. As a result, the wiper 58 of the switch D is brought into engagement with the tenth contact in the sixth level of bank contacts, which is the contact 12. When the ground potential is placed upon bank contact 12, subsequent to the wiper 58 being brought into engagement with it, relay 5 is short circuited and accordingly deenergizes. When this occurs the lamp L³ is extinguished and the lamps L' and L² are lighted. The pilot lamp L is lighted and the buzzer B is operated in the usual manner. The despatcher after being informed that the circuit breaker CB⁴ has been tripped returns to push button P' to normal, thereby extinguishing the individual pilot lamp L'.

In the substation, when the circuit breaker CB⁴ is tripped the motor generator unit MG stops and the magnet 323 of the starter S becomes deenergized, whereupon the armature 321 is drawn out of engagement with member 325. When this occurs the starter S returns to normal position and the ground potential is removed from conductor 301 and placed upon conductor 302. Relay 203 now deenergizes and relay 202 energizes. Upon energizing, relay 202 closes a circuit for relay 163 at armature 184. Relay 163, upon energizing, in addition to closing the locking circuit for itself and placing ground upon start conductor 190 closes a circuit for relay 169 and at the two remaining armatures connects the first digit stop conductor 188 with the first impulse stop conductor 191 and connects the second digit stop conductor 189 with the second impulse stop conductor 192. As a result, the associated mechanism operates in the hereinbefore described manner first to close a circuit for the line relay 39 of the switch D and then to produce two series of interruptions in the said circuit the first of which comprises only one interruption and the second of which comprises two interruptions. As a result the wiper 58 is brought into engagement with the second bank contact in the first level and the associated signals are operated in the usual manner.

If the despatcher desires to leave the circuit breaker CB⁴ thrown in he may still disconnect the motor unit of the motor generator MG by causing the wiper of the controlling switch D' to be brought into engagement with the bank contact 110, thereby placing a ground potential upon conductor 115. Relay 312, associated with the starter S, upon energizing, in response to the ground potential being placed upon conductor 115 opens the circuit of magnet 323 at armature 312, whereupon the starter S is restored to normal position.

In regard to the motor generator MG' it may be said that the associated apparatus comprising the circuit breakers CB³ and CB⁵ and the starter S' are controlled in the same manner as the apparatus associated with the motor generator MG and comprising the circuit breakers CB² and CB⁴ and the starter S, respectively. It may be said also that the main circuit breaker CB is controlled in the same manner as any of the others.

It may happen at sometime that one of the control circuits between the despatcher's office and the substation is opened, by the breaking of one of the conductors for example, and in order to take care of such an emergency the over load control system comprising the relay group RG², Fig. 4, and the motor M is provided. This over load control system is automatically cut into service and the despatcher is notified, when one of the control circuits is opened, in a manner which will be explained now. Assuming that one of the two circuits between the despatcher's office and the substation is opened, the control circuit shown in Fig. 2 and comprising conductors 83 and 84 for example, the normally energized relays 67 and 91, associated with the relay group RG and the switch D', respectively, deenergize. Relay 67, upon deenergizing, completes the following circuit for relay 2, Fig. 1: from ground by way of armature 76 and its resting contact, armature 81 and its resting contact, armature 73 and its resting contact, conductor 74, and relay 2 to battery. Relay 2, upon energizing, closes a circuit for the lamp L⁷ at armature 27, and at armature 28 closes a circuit for the buzzer B, including spring 29 and its resting contact of the push button P⁸. The despatcher, upon hearing the buzzer B and upon noting the lighted condition of the lamp L⁷, is informed that the circuit between the relay group RG and the switch D' is open and, in order to disconnect the buzzer B and prepare a circuit for it which will be closed upon the subsequent deenergization of relay 2, he operates the push button P⁸, whereupon the circuit of the buzzer B is opened at spring 29.

In the substation, relay 91 of the switch D', upon deenergizing, places ground upon conductor 113 at armature 100 by way of a circuit which includes armatures 104 and 108 and their resting contacts. When ground is placed upon conductor 113, it is extended to the armature 223 of the marginally adjusted control relay 220 of the relay group RG² and, assuming that the load is below the maximum that can be carried safely by the motor generator MG', in which case armature 223 is retracted as shown, a circuit is closed for slow releasing relay 218 by way of armature 233 and its resting contact, armature 223 and its working contact, and the resting contact of armature 226 and said armature. A circuit is closed also for relay 219 by way of armature 230 and its resting contact. Relay 218, upon energizing, opens the circuit of relay 219 at armature 230 before the said relay has energized fully. As a further result of the energization of relay 218, it disconnects ground from armature 221 at armature 228 and at armature 229 opens a point in the circuit of relay 217.

Assuming now that the load becomes more than can be safely carried by the motor generator MG' for more than a short length of time, the marginally adjusted relay 220 attracts its armature 233, thereby opening the circuit of slow releasing relay 218 and preparing a circuit for slow releasing relay 217. As soon as slow releasing relay 218 deenergizes it completes a circuit for relay 217 at armature 229, and at armature 230 completes a circuit for relay 219. Relay 219, upon energizing, connects the trip conductor 242 of the circuit breaker CB² and the trip conductor 117 of the circuit breaker CB⁴ to the working contact of armature 230 at armatures 231 and 232. This however, does not produce any result for the time being. Relay 217, upon energizing, opens another point in the circuit of relay 218 at armature 226 and at armature 227 completes the following circuit for the motor M: from ground by way of the resting contact of armature 222 and said armature, working contact of armature 227 and said armature, armature 225 and its working contact, and the motor M to battery. The motor now begins to drive the contactor 234 in a clockwise direction. As soon as the contactor 234 is moved out of engagement with the contact on which it normally rests and to which the winding of relay 216 is connected, the said relay 216 deenergizes, thereby opening still another point in the circuit of relay 218 at armature 223. This is done to prevent the operations now under way from being stopped in a partly finished condition in case the load should decrease before they are completed. As a further result of the deenergization of relay 216, armature 225, upon being retracted, moves out of engagement with its working contact, thereby opening the initial circuit of the motor M. Just before this occurs, however, a new circuit for the motor M is completed which includes the grounded contact 254 and the working contact of armature 225. As a still further result of the deenergization of relay 216, it closes a circuit for relay 215 at armature 224. Relay 215, upon energizing, closes a locking circuit for itself at armature 221, which circuit includes armature 228 and its resting contact. As a further result of the energization of relay 215 it opens still another point in the initial circuit of the motor M at armature 222. As soon as the contactor 234 comes into engagement with the contact with which the conductor 116 is connected, a circuit is closed for solenoid 341 of the circuit breaker CB⁴, whereupon the said circuit breaker is thrown in, in the usual manner. As soon as the contactor 234 rotates a little further, it comes into engagement with the arcuate contact strip 255, thereby closing a circuit for the starting solenoid 334 of the starter S, whereupon the said starter is operated in the hereinbefore described manner to connect up the associated auto transformer and to connect the secondary taps thereof with the motor unit of the motor generator MG. The contactor 234 continues to be rotated and remains in engagement with the contact strip 255 long enough to allow the motor generator MG to be brought up to its running speed.

After a time the contactor 234 passes off the contact strip 255 and comes into engagement with the contact which is connected with the solenoid 333 of the starter S. The solenoid 334 now becomes deenergized and the solenoid 333, upon energizing, throws the starter S into running position. The contactor 234, upon coming into engagement with the next contact, closes a circuit for the solenoid 240 of the circuit breaker CB², whereupon the said circuit breaker is thrown in in the usual manner. When this occurs the motor generator MG takes its share of the load.

Upon reaching the starting point, the contactor 234 again closes the circuit of relay 216. Upon energizing, relay 216 prepares a circuit for relay 218 at armature 223, and at armature 224 opens the initial circuit of relay 215 but the said relay is maintained energized over its locking circuit which includes armatures 221 and 228. As a still further result of the energization of relay 216, it opens the circuit of the motor M at armature 225, armature 222 being operated at this time. When the circuit of the motor M is opened the said motor stops leaving the contactor 234 in engagement with the contact to which relay 216 is connected.

Assuming now that the load decreases until it can be carried by the motor generator MG', the marginally adjusted relay 220 retracts its armature 223, thereby opening the circuit of relay 217 and preparing a circuit for relay 218. Relay 217, upon deenergizing, opens another point in the circuit of the motor M at armature 227, and at armature 226 closes the previously traced circuit for relay 218. Relay 218, upon energizing, opens another point in the circuit of relay 217 at armature 229; opens the locking circuit of relay 215 at armature 228, whereupon the said relay 215 deenergizes and prepares a circuit for the motor M at armature 222. As a further result of the energization of relay 218, it opens the circuit of relay 219 at armature 230 and closes a circuit for the trip magnets 248 and 340 of the circuit breakers CB² and CB⁴, respectively. Relay 219, being slow releasing, maintains the armatures 231 and 232 attracted for an interval. In response to the closing of the circuits of trip magnets 248 and 340 the circuit breakers CB² and CB⁴ are tripped in the usual manner. Relay 219, upon deenergizing, opens the circuit of trip magnets 248 and 340 at armatures 231 and 232. The circuits of the relay group RG² are now in condition for the motor generator unit MG to be put into service again in case the load becomes too much for the motor generator MG' to carry alone.

It may be stated that the reason for making relays 217 and 218 slow releasing is to keep them from responding to momentary changes in the load.

When the circuit comprising conductors 83 and 84, Fig. 2, is finally repaired, relays 67 and 91 of the relay group RG and the switch D', respectively, energize again. Relay 67, upon energizing, opens the circuit of relay 2, Fig. 1, whereupon the said relay 2 deenergizes; extinguishes the lamp L⁷ at armature 27; and at armature 28 closes a circuit for the buzzer B, by way of spring 29 of the push button P³ and its working contact. The despatcher, upon hearing the buzzer B, notes that the circuit is repaired as indicated by the unlighted condition of the lamp L⁷ and restores the push button P³ to normal position, thereby opening the circuit of the said buzzer.

In the substation, relay 91 of the switch D', upon deenergizing removes ground from the conductor 113 whereupon the relay group RG' is rendered inoperative again and relays 218 and 219 deenergize.

Referring now particularly to Figs. 9 and 4, the operation of the ammeters A and A' will now be described. The ammeter A, Fig. 4, which is connected so as to indicate the amount of current fed to the trolley wire 235, comprises essentially a pointer 256 and a plurality of contacts over which the pointer travels, together with the necessary element for moving the pointer in accordance with the load. As shown, the pointer 256 is grounded and a conductor is connected to each of the contacts over which it is adapted to pass. Each of these conductors is assumed to extend to individual relay groups similar to the individual relay groups shown in Fig. 3, to which the conductors 301–304, inclusive, extend. The first of these conductors associated with the ammeter A is assumed to extend to a relay group which when actuated in the previously described manner causes the wiper 58 of the controlling switch D in the despatcher's office to be raised to the tenth level of bank contacts and rotated into engagement with the first bank contact in that level. In the same way each of the other relay groups to which the conductors from the ammeter A extend, are connected so as to cause the wiper of the controlling switch D in the despatcher's office to be raised to the tenth level of bank contacts, the actuation of the group of relays to which the second conductor is connected causing the wiper of the switch D to be brought into engagement with the second contact in the tenth level, and so on up to the tenth group which causes the wiper to be brought into engagement with the tenth contact in the tenth level.

The tenth level of bank contacts of the switch D is shown in Fig. 9 and comprises the bank contacts 401–410, inclusive, contact 401 being assumed to be the first contact in the tenth level and 410 the tenth.

The ammeter A' is assumed to be provided with a graphic recording arrangement which may be of any well known type and is driven by the motor M' which has a normally energized field winding, as shown. The armature of the motor M' occupies the position of a galvanometer in the associated Wheatstone bridge, as shown. As long as the bridge is balanced no current flows through the armature but when the bridge becomes unbalanced current flows through the armature in one direction or to the other depending upon which of the left hand arms has the higher resistance. The Wheatstone bridge is unbalanced each time one of the relays connected with the bank contacts 401–410 is energized. The pointer 256 of the ammeter A, as shown, is on the fifth contact and consequently the last signal sent in by the said ammeter causes the wiper of the switch D to place ground upon the fifth contact 405 with the result that the relay 412 connected with that bank contact is caused to energize and become locked up, as shown. With relay 412 energized, ground is placed upon the fifth top of the lower left hand arm of the bridge at armature 421. The balance, however, is restored by the pointer 424 which is in engagement with the contact in which the fifth tap of the upper left hand arm of the bridge terminates. Assuming now that the pointer of the ammeter A moves into engagement with some other contact, the tenth for example, the resulting operations cause the wiper of the switch D to be brought into engagement with the tenth bank contact in the tenth level, which is the bank contact 410. When this occurs a circuit is closed for relay 413. Upon energizing, relay 413 opens the locking circuit of relay 412 and prepares a locking circuit for itself at armature 417. Relay 412, upon deenergizing, completes at armature 419 the following locking circuit for relay 413: From ground by way of armature 420 and its resting contact, similar armatures and contacts of the intermediate relays, armature 419 and its resting contact, similar armatures and contacts of the other intermediate relays, armature 418 and its working contact, lower winding of relay 413, working contact of armature 417 and said armature, and resistance 414 to battery. After a short time the initial circuit of relay 413 is opened when ground is removed from contact 410 but the said relay 413 remains energized over the above traced circuit. As a further result of the deenergization of relay 412, it removes ground from the fifth tap of the lower left hand arm of the bridge, and as a further result of the energization of relay 413 ground is placed on the tenth tap of the said lower left hand arm. As a result, the bridge is unbalanced and current flows through the armature of the motor M', whereupon the said motor operates to drive the pointer 424 in a clockwise direction until it comes into engagement with the contact in which the tenth tap of the upper left hand arm of the bridge is terminated, whereupon the balance is again restored and the motor stops.

Assuming now, for the sake of illustration, that the load disappears entirely at the substation, in which case the pointer 256 of the ammeter A is returned to zero position in engagement with the first contact, the subsequent operations cause the wiper of the switch D to come into engagement with and place ground upon the first bank contact 401 in the tenth level, thereby closing a circuit for the upper winding of relay 411. Upon energizing, relay 411 opens the circuit of relay 413 and prepares a locking circuit for itself at armature 420. Relay 413, upon deenergizing, completes the following locking circuit for relay 411 at armature 417: From ground by way of armature 420 and its working contact, the lower winding of relay 411, the working contact of armature 415 and said armature, resting contacts and armatures of intermediate relays, the resting contact of armature 416 and said armature, similar contacts and armatures of the remaining intermediate relays, resting contact of armature 417 and said armature, and resistance 414 to battery. Relay 411 accordingly remains locked up over this circuit after the ground has disappeared from bank contact 401. As the effective result of the deenergization of relay 413 and the energization of relay 411, ground is removed from the tenth tap of the lower left hand arm of the bridge at armature 423 and is placed upon the first tap of the said arm at armature 421. This time the current flows through the armature of the motor M' in a direction opposite to that in which it flowed in the previous example and accordingly the pointer 424 is driven in a counter clockwise direction. When the pointer 424 comes into engagement with the contact in which the first tap of the upper left hand arm of the bridge terminates the balance is restored and the motor M' stops.

The two foregoing examples of the operation of the ammeters A and A' were given merely to illustrate the operation. It will be understood, of course, that the pointer of the ammeter A will probably, under most load conditions, merely move along the scale slowly from one contact to the next, and sometimes several minutes or even an hour or so may pass before the pointer is brought into engagement with the next higher or lower contact.

It is to be understood that, in case it is so desired, the number of contacts over which the pointer 256 of the ammeter A passes may be increased or decreased as desired, providing, of course, that the ammeter A' and associated equipment is changed accordingly.

Referring now particularly to the switch D, Fig. 1, the function of the shaft operated springs 62 and 63 will be explained. It will be remembered that relay 35 of the switch D, which is energized during the rotary movement of the wiper 58, as explained hereinbefore, upon energizing, closes a circuit for pilot relay 4 at armature 51. It is desirable, however, to have the ammeter changing signals come in without operating the said pilot relay 4. This is accomplished by the springs 62 and 63 which are operated by the switch shaft when the wiper 58 is stepped up to the tenth level of bank contacts, which is the level to which the ammeter control relays, Fig. 9, are connected. The switch shaft, carries a projection which engages with the lower curved portion of the spring 63 when the said shaft is raised so that the wiper 58 stands opposite the tenth level of bank contacts, thereby causing the spring 62 to be moved out of engagement with its resting contact.

Referring now particularly to Figs. 6, 7, and 8 the equipment shown therein will be explained a little more in detail. The equipment shown in Fig. 6 is a desirable modification of the equipment which includes the lamps L', L² and L³, Fig. 1. The conductors 118 and 119 correspond to the conductors which are associated with bank contacts 11 and 12. The operation may be explained as follows: When a ground potential is placed upon conductor 119 momentarily by a wiper such as the wiper 58 of the switch D, relay 124 energizes and closes a locking circuit for itself at the same time extinguishing one of the signal lamps and lighting the other at its lower armature. When a ground potential is subsequently placed upon conductor 118 the relay is deenergized by the differential action of its two windings. The individual pilot lamp, which is the upper one of the three, is controlled by the push button P⁵ in the hereinbefore described manner.

The equipment in Fig. 7 is designed to perform the same functions as the equipment shown in Fig. 6, conductors 120 and 121 are assumed to be respectively connected to contacts 12 and 11 of Fig. 1. It will be noted that there is a circuit normally closed which includes the resistance 88, the visual signal 86, and the drop 87. The resistance 88, however, is so high that neither the visual 86 nor the drop 87 operates in series with it. Assuming now that a ground potential is placed upon the conductor 120, a circuit is closed for the drop 87 and the visual signal 86 independent of the high resistance 88, whereupon they attract their respective armatures. The indicator of the drop 87, upon falling, performs the function of the individual pilot lamp in Fig. 6, and the visual 86 is so adjusted that when once operated it will be maintained in that position in series with resistance 88. The armature of the drop 87, however, restores when the ground potential is removed from conductor 120. The despatcher restores the indicator of the drop 87 to the position shown in the drawing by hand.

When a ground potential is subsequently placed upon conductor 121, the drop 87 is again operated and the visual signal 86, upon being short circuited, deenergizes.

Referring now to Fig. 8, the apparatus shown therein differs from the apparatus shown in Fig. 6 principally in that two relays instead of one are employed. Assuming that a ground potential is placed upon the bank contact in which conductor 123 terminates, a circuit is closed for the lower winding of relay 89 and the said relay, upon energizing, opens the circuit of relay 88 at its upper pair of contacts and prepares a locking circuit for itself. When the circuit of relay 88 is opened the associated lamp becomes extinguished and when the said relay 88 deenergizes the locking circuit is completed for relay 89 and the lamp associated with the latter relay becomes lighted. The lower armature of relay 89 and the associated push button controls the usual individual pilot lamp.

It may sometimes occur that it is more desirable to have an attendant in each substation who receives orders from a despatcher and performs the various operations by hand rather than have the equipment controlled directly by the signals received from the despatcher's office. When such an occasion arises the change in position of the various devices in the substation may be indicated to the despatcher in the previously described manner, and ammeters A and A' may cooperate in the manner described. The principal change that it is necessary to make is that the bank contacts of the switch D' are disconnected from the various pieces of apparatus in the substation and are connected each to a different signal, and accordingly when the despatcher desires to operate some piece of apparatus in the substation the resulting operations merely cause a signal to be operated in the substation, and the attendant, upon seeing it, performs the desired operation by hand.

When this system is carried out, it is desirable to have some means of checking up to determine the faithfulness and alertness of the attendant employed, and, in order to do this, the apparatus shown in Fig. 10 makes a record of the time when a signal is received to perform a certain operation and another record of the time when the operation is finally performed. Referring now particularly to Fig. 10, the conductor 425 is assumed to be connected to one of the bank contacts of the switch D' and, assuming that the despatcher causes the wiper 98 of the switch D' to be brought into engagement with the bank contact in which the conductor 425 terminates, a momentary ground potential is placed upon the conductor 425 in the usual manner, thereby operating the drop 433. The indicator of the drop 433, upon falling, closes a circuit for the buzzer B' thereby attracting the attention of the attendant.

The attendant, upon hearing the buzzer B', observes the various drops and upon noting that the drop 433 is the one operated he restores it to normal, thereby opening the circuit of the buzzer B'. The attendant now proceeds to perform the operation indicated by the drop 433. As a further result of the ground potential being placed upon conductor 425 a circuit is closed for magnet 428, and the associated armature 432, upon being attracted, causes the pencil point which it carries to make a mark on the tape 429 which is passing over the roller 430 in a direction indicated by the arrow heads.

When the attendant has performed the desired operation which we shall assume is to throw in the circuit breaker CB⁴ the ground potential is removed from conductor 304 and placed upon conductor 303 with the result that relays 174 and 175 energize one after the other and that relay 175 remains energized until the operations, necessary to inform the despatcher that the circuit breaker CB⁴ has been thrown in, have taken place. As long as relay 175 is energized, a ground potential is held upon conductor 426 at armature 211. The conductor 426 extends to magnet 427, Fig. 10, and said magnet 427, upon energizing, attracts armature 431, whereupon the pencil point carried by the said armature is brought into engagement with the tape 429. The time that has elapsed between the first mark and the second is indicated by the distance that separates them on the tape 429. It is to be understood, of course, that the tape 429 is operated by suitable means, preferably clockwork, so that it will indicate time fairly accurately. It will be understood also that the pencils carried by the armatures 431 and 432 are arranged to make marks which are easily distinguished from each other, which may be accomplished by providing them with marking material of different colors or shapes. The tape 429 may be made wide enough to accommodate all the recording sets which are necessary, or several tapes may be provided.

Referring now particularly to Fig. 3, it will be noted that certain of the relays covering the center of control group RG' are maintained permanently energized by means of a make contact on the relay and the ground at the switching device with which the relay is associted. It will be seen that relay 169 is such a relay and is shown energized over circuits traceable from ground at spring 324 and its break contact over the conductor 302 to the make springs on relay 169 to battery. Similarly relay 170 is locked up to a ground extended to it over conductor 304 from spring 343 and its break contact. In the event that battery should be accidentally cut off from this relay group, these locked relays will, of course, be deenergized. As the further result of the removal of battery from the relay group shown in Fig. 3, the sending of signals to the control station responsive to the movement of a switching device at the substation will be impossible. The attendant at the control station is, therefore, unable to supervise the substation in the manner hereinbefore set forth. However, when battery is again placed on the relay group of Fig. 3, the sender switch C will be operated to transmit signals to the control station indicating the position of such switching devices as were associated with locked up relays such as 169 and 170. In addition to this any switching device which has changed its position during the interval that the relay group was without battery will be similarly reported. Assume for instance that the circuit breaker S, Fig. 5 has changed its position while the relay group was without battery and prepares a circuit for energizing relay 201 by placing ground on conductor 301, relay 201 will energize immediately when the battery is restored and at spring 183 will open the chain for the purpose hereinbefore described. Immediately the sender group RG' will operate the switch C to send the signal corresponding to the new position of the switching device S, at the completion of which the switch C and the relay group RG' will be released as before. As soon as relay 201 deenergizes and at springs 183 completes a point in the chain group of the starting circuit, the next relay of the chain which has been unlocked, such as relay 170, and the relay group RG' will be operated to send in the signal corresponding to that device. In a similar manner the remaining relays of the group will report their position in turn to the control station, so that in case that battery is interrupted from the sender control relay group and then reapplied, the sender is actuated to make a complete report of the position of all the switching devices at the substation, so that the attendant at the control station may be apprised of the conditions in the substation which he has to control.

The various features of the invention having been described, will now be pointed out in the appended claims.

What is claimed is:

1. In a power system comprising a control station and a distant substation, an interconnecting control circuit, a plurality of circuit breakers at the substation, a group of "in" and "out" lamp signals at the control station for each circuit breaker, a third signal lamp in each of said groups, a relay associated with each of said groups, a key for preparing alternate circuits for said lamp including contacts on said relay, and means at the control station actuated automatically over said control circuit responsive to the operation of any circuit breaker for operating said associated relay to light one of the in and out lamps and the change lamp to indicate the changed position of the circuit breaker.

2. In a power system comprising a control station and a distant substation, a plurality of circuit breakers at the substation, a set of lamps at the control station for each circuit breaker, each set including an "in" lamp and an "out" lamp, automatic means for lighting one lamp of a set and for extinguishing the other lamp whenever the associated circuit breaker changes its position, a third lamp in each set, and means for automatically lighting the third lamp in any set whenever a change takes place in the lighting of the associated "in" and "out" lamps, and manually operated means for extinguishing said lamp and for preparing a circuit to indicate the next change.

3. In a power system comprising a control station and a distant substation, a plurality of circuit breakers at the substation, a set of lamps at the control station for each circuit breaker, each set including an "in" lamp and an "out" lamp, automatic means for lighting one lamp of a set and for extinguishing the other lamp whenever the associated circuit breaker changes its position, a third lamp in each set, means for automatically lighting the third lamp in any set whenever a change takes place in the lighting of the associated "in" and "out" lamps, and manually operated means comprising a key associated with the third lamp of each set for extinguishing it, and for preparing the lamp circuits to indicate the next change.

4. In a power system comprising a control station and a distant substation, remote control equipment for enabling an attendant at the control station to start and stop electrical machines in the substation, a circuit over which the control is exercised, an automatic overload machine starting device at the substation which is normally inoperative, and means responsive to the opening of said circuit for automatically rendering said device operative whenever said control circuit gets out of order.

5. In a remote control system, a circuit extending between a control station and a distant substation, an attendant's calling device at the control station for transmitting series of impulses over said circuit, a progressively movable switch at the substation responsive to impulses, means including relays controlled by said calling device for retaining said switch in operated position after the transmission of the first series of impulses, and means at the control station controlled by said calling device for causing said switch to release after the transmission of the second series of impulses independent of any act by the attendant.

6. In a power system comprising a control station and a distant substation, an interconnecting control circuit, a current responsive device connected in a local circuit at the substation, means for transmitting code impulses over said control circuit operated by said device whenever the current in said local circuit changes its value a given amount, an automatic switching device at the control station responsive to said impulses, and an alarm operative whenever said switching device is actuated, indicating means controlled by said switching device for indicating the position of said current responsive device, and means for preventing the operation of said alarm when said switching device is operated to control said current indicating means.

7. In a power system comprising a control station and a distant substation, an interconnecting control circuit, a current responsive device connected in a local circuit at the substation, means for transmitting code impulses over said control circuit operated by said device whenever the current in said local circuit changes its value a given amount, an automatic switching device at the control station responsive to said impulses, a signaling means comprising a motor driven indicating arm, a Wheatstone bridge circuit for the armature of said motor, means responsive to the positioning of said switch for unbalancing said bridge to cause said motor to reposition said indicating arm in accordance with the position of said current responsive device.

8. In a power system comprising a control station and a distant substation, remote control equipment for enabling an attendant at the control station to start and stop electrical machines, in the substation, a control circuit between said stations over which relays at said stations are normally energized, an alarm at the control station, automatic load controlled equipment at the substation by means of which the number of machines in operation is governed automatically by load conditions, said alarm and load controlled equipment being normally inoperative and means controlled by the deenergization of said normally energized relays for rendering said alarm and load controlled equipment operative.

9. In a remote control power switching system, a control station and a distant substation, remote control equipment enabling an attendant at the control station to start and stop electrical machines in the substation, a plurality of control circuits between said stations, an alarm at the control station, overload equipment at the substation arranged to automatically vary the machines in operation according to load conditions, said alarm and overload equipment being normally inoperative, and means for rendering said equipment operative in case of a fault in said control circuits.

10. In a remote control system, a control station and a distant substation, an impulse sending device, a progressively movable automatic control switch, a control circuit normally closed through a supervisory relay in the control switch, a supervisory relay associated with said calling device and normally closed contacts therein, and a marginal impulsing relay in said automatic switch, and means responsive to the moving of said impulsing device out of its normal position for short circuiting said supervisory relays and for energizing said marginal relay to render said switch responsive to impulses subsequently sent over said control circuit by said impulsing device.

11. In a remote control system, a control station and a distant substation, an alarm at the control station, automatic load controlled equipment at the substation, an impulse sending device, an automatic switch, a control circuit between said stations normally closed through normally operated supervisory relays at said impulsing device and switch, through a marginal relay at said switch, and through normally closed springs in said impulsing device, means for rendering said alarm and load controlled equipment effective if said normally closed circuit is opened, means responsive to the moving of said impulsing device out of its normal position for short circuiting said normally operated relays and for operating said marginal relay to render said switch responsive to subsequent impulses sent over said control circuit by said device, and means for rendering said alarm and load controlled equipment ineffective during impulsing.

12. In a remote control system comprising a control station and a distant substation, a control circuit between said stations, a sending device in said substation, a contact making ammeter movable to different positions, means whereby said sender is operated through the contacts of said ammeter to transmit a code of impulses over said circuit, a selective switch operated by said code of impulses transmitted to position it in a position characteristic of said code, an indicating device at said control station, and means operated through said positioned switch to position said indicating device in accordance with the position of said ammeter.

13. In a remote control system, a switching device having a plurality of positions, a lamp signal group including a signal for each position of said device, a key associated with said signal group, means operated in response to a change in position of said device to alter said group to indicate that the device has changed its position and its new position, and means actuated by said key to again alter said signal group to indicate only the new position of the device.

14. In a remote control system, a control circuit terminating in a selective device, means comprising an impulsing device operated to render said circuit operative and to transmit a series of impulses over it, means operated by said calling device during the transmission of said impulse series for maintaining said circuit operative thereafter, and means, operated by a reoperation of said calling device in transmitting a second series of impulses, for automatically restoring said circuit to normal at the end of said second series.

15. In a remote control system, a control circuit including a calling device and a selective switch, controlling means associated with said circuit including a relay operated when said calling device is operated to seize said circuit, another relay operated at the end of a first series of impulses sent over said circuit by said calling device to maintain said circuit seized, and a relay automatically operated at the end of a second impulse series to release said circuit and restore it and said controlling means to normal.

16. In a remotely-controlled substation, a control station and a substation, a control circuit connecting the two, an automatic switch and power devices at the substation, means for operating said automatic switch over said control circuit for controlling said power devices, an alarm signal, and normally energized relays in the control circuit, the deenergizing of said relays whenever the control circuit is out of order placing the power devices under automatic control and operating said alarm signal.

17. In a remote control power system comprising a control station and a distant substation, a control circuit between said stations, a multiposition indicating device and a selecting switch in said control station, said switch having a plurality of contacts through certain ones of which said device is controlled, a sending device including means for controlling said selecting switch over said control circuit by codes of impulses, a contact making current responsive device including means for automatically controlling said sending device to send a code of impulses indicative of the position of said current responsive device to said selecting switch to set it upon a certain one of said contacts, and means operable in response to the positioning of said switch to position said indicating device in accordance with the position of said current controlled device.

18. In an electrical control system, the combination with a control office, a substation, and apparatus units in said substation for controlling a supply of electrical current, a two-conductor trunk line connecting said office and substation, a signalling device at said office, means controlled by one of said units for operating said device over a circuit including said trunk line and independent of ground, and means controlled over the same said circuit for registering at the control office the amount of said current supply.

19. In an electrical control system, the combination with a control office, a substation, and apparatus units in said substation for controlling a supply of electrical current, of a two-conductor trunk line connecting said office and substation, a signalling device at said office, means for operating one of said units, means responsive to such operation for operating said signalling device over a circuit independent of ground but including said trunk line, and means controlled over the same said circuit for registering at the control office the amount of said current supply.

20. In an electrical control system, the combination with a control office, a substation, and apparatus units in said substation for controlling a supply of electrical current, a two-conductor trunk line connecting said office and substation, a signalling device at said office, means controlled by any one of said units for operating said device over a circuit including said trunk line and independent of ground, and means controlled over the same said circuit for registering at the control office the amount of said current supply.

21. In an electrical control system, the combination with a control office, apparatus units remotely disposed with respect to said office for controlling a supply of electrical current, an audible signalling device, means for operating one of said units, and common means responsive to such operation for operating said signalling device, and for controlling the registration of the amount of current supply.

In witness whereof, I hereunto subscribe my name this 7th day of November, A. D. 1921.

MARTIN L. NELSON.